(12) United States Patent
Uelmen et al.

(10) Patent No.: US 11,597,405 B2
(45) Date of Patent: Mar. 7, 2023

(54) APPLICATION-BASED CONTROLS FOR WHEELCHAIR-ACCESSIBLE AUTONOMOUS VEHICLE

(71) Applicant: GM Cruise Holdings LLC, San Francisco, CA (US)

(72) Inventors: Jessica Uelmen, San Francisco, CA (US); Rajat Basu, San Francisco, CA (US)

(73) Assignee: GM Cruise Holdings LLC., San Francisco, CA (US)

( * ) Notice: Subject to any disclaimer, the term of this patent is extended or adjusted under 35 U.S.C. 154(b) by 249 days.

(21) Appl. No.: 16/887,741

(22) Filed: May 29, 2020

(65) Prior Publication Data

US 2021/0370976 A1 Dec. 2, 2021

(51) Int. Cl.
| | |
|---|---|
| *A61G 3/00* | (2006.01) |
| *B60W 60/00* | (2020.01) |
| *A61G 3/08* | (2006.01) |
| *B60W 10/30* | (2006.01) |
| *A61G 3/06* | (2006.01) |
| *G08G 1/123* | (2006.01) |
| *B60W 50/08* | (2020.01) |

(52) U.S. Cl.
CPC ......... *B60W 60/0025* (2020.02); *A61G 3/061* (2013.01); *A61G 3/0808* (2013.01); *B60W 10/30* (2013.01); *B60W 50/08* (2013.01); *G08G 1/123* (2013.01); *B60W 2710/30* (2013.01)

(58) Field of Classification Search
None
See application file for complete search history.

(56) References Cited

U.S. PATENT DOCUMENTS

| | | | |
|---|---|---|---|
| 2017/0308082 A1* | 10/2017 | Ullrich | B60W 60/0059 |
| 2018/0284793 A1* | 10/2018 | Wood | B60K 28/12 |
| 2019/0061619 A1* | 2/2019 | Reymann | B60Q 9/00 |
| 2020/0060903 A1* | 2/2020 | Shiga | B60N 2/3043 |
| 2020/0104770 A1* | 4/2020 | Aich | G01C 21/3423 |
| 2020/0262326 A1* | 8/2020 | Honda | B60N 2/002 |
| 2020/0312145 A1* | 10/2020 | Hintermeister | G09B 21/006 |
| 2020/0410408 A1* | 12/2020 | Shitara | B60N 2/002 |
| 2021/0020305 A1* | 1/2021 | Ray | G16H 80/00 |
| 2021/0039539 A1* | 2/2021 | Nakai | B60N 3/023 |
| 2021/0053528 A1* | 2/2021 | Sekizuka | B60R 22/48 |
| 2021/0053585 A1* | 2/2021 | Ohno | A61G 3/00 |
| 2021/0117871 A1* | 4/2021 | Mitra | A61G 5/02 |
| 2021/0125110 A1* | 4/2021 | Yamazaki | G08B 7/066 |

(Continued)

*Primary Examiner* — Jonathan M Dager
(74) *Attorney, Agent, or Firm* — Polsinelli PC

(57) ABSTRACT

The subject disclosure relates to techniques for application-based controls of a wheelchair-accessible autonomous vehicle. A process of the disclosed technology can include steps for receiving a request for a wheelchair-accessible autonomous vehicle (WAV) to execute an ingress function, wherein the ingress function includes a deployment of a wheelchair ramp by the WAV, sending an ingress command to the WAV in response to the request, wherein the ingress command comprises instructions cause the WAV to execute the ingress function at a specified pick-up location, and receiving feedback from the WAV, the feedback includes sensor data associated with a wheelchair ramp and status information associated with the ingress function. Machine-readable media and systems are also provided.

20 Claims, 6 Drawing Sheets

(56) References Cited

U.S. PATENT DOCUMENTS

| | | |
|---|---|---|
| 2021/0150434 A1* | 5/2021 | Keen ................ G06Q 10/06311 |
| 2021/0209517 A1* | 7/2021 | Shimodaira ............ G08G 1/202 |
| 2021/0209713 A1* | 7/2021 | Imtiyaz ................. G06Q 50/30 |
| 2021/0223051 A1* | 7/2021 | Hochberg .......... G06Q 10/0631 |
| 2021/0275368 A1* | 9/2021 | Nagata ..................... B60N 2/06 |
| 2021/0369516 A1* | 12/2021 | Basu .................... A61G 3/0808 |
| 2021/0380022 A1* | 12/2021 | Kanitz ..................... B60N 2/01 |

* cited by examiner

400

```
┌─────────────────────────────────────────────────────────┐
│ RECEIVE A RIDESHARE REQUEST TO USE A WHEELCHAIR ACCESSIBLE │
│                  AUTONOMOUS VEHICLE                      │
│                        (402)                             │
└─────────────────────────────────────────────────────────┘
                            │
                            ▼
┌─────────────────────────────────────────────────────────┐
│      DISPATCH THE WAV TO A LOCATION OF THE PASSENGER     │
│                        (404)                             │
└─────────────────────────────────────────────────────────┘
                            │
                            ▼
┌─────────────────────────────────────────────────────────┐
│  DETERMINE THAT THE WAV HAS ARRIVED AT THE LOCATION OF THE │
│                       PASSENGER                          │
│                        (406)                             │
└─────────────────────────────────────────────────────────┘
                            │
                            ▼
┌─────────────────────────────────────────────────────────┐
│   RECEIVE A REQUEST FOR THE WAV TO EXECUTE AN INGRESS    │
│                       FUNCTION                           │
│                        (408)                             │
└─────────────────────────────────────────────────────────┘
                            │
                            ▼
┌─────────────────────────────────────────────────────────┐
│   SEND AN INGRESS COMMAND TO THE WAV IN RESPONSE TO THE  │
│                        REQUEST                           │
│                        (410)                             │
└─────────────────────────────────────────────────────────┘
                            │
                            ▼
┌─────────────────────────────────────────────────────────┐
│              RECEIVE FEEDBACK FROM THE WAV               │
│                        (412)                             │
└─────────────────────────────────────────────────────────┘
                            │
                            ▼
┌─────────────────────────────────────────────────────────┐
│       SEND THE FEEDBACK TO THE PASSENGER OF THE WAV      │
│                        (414)                             │
└─────────────────────────────────────────────────────────┘
           │                                      │
           ▼                                      ▼
┌──────────────────────┐              ┌──────────────────────┐
│ CONNECT THE PASSENGER│              │ RECEIVE INFORMATION  │
│    WITH A REMOTE     │─────────────▶│ FROM THE PASSENGER   │
│  ASSISTANCE OPERATOR │              │ INDICATING READINESS │
│        (416)         │              │        (418)         │
└──────────────────────┘              └──────────────────────┘
```

FIG. 4

APPLICATION-BASED CONTROLS FOR WHEELCHAIR-ACCESSIBLE AUTONOMOUS VEHICLE

BACKGROUND

1. Technical Field

The subject disclosure provides solutions for accessing wheelchair-accessible autonomous vehicles and in particular for using application-based controls to request the wheelchair-accessible autonomous vehicles to execute functions.

2. Introduction

In current vehicles, another individual must help passengers with wheelchairs to get into and out of the vehicle. In some instances, a human driver may be unable to assist with loading and unloading the wheelchair into the vehicle. This problem is exacerbated as vehicles become autonomous and no longer have human drivers. In an autonomous ridesharing environment, there will not necessarily be an additional individual to assist with the ingress and egress processes.

BRIEF DESCRIPTION OF THE DRAWINGS

Certain features of the subject technology are set forth in the appended claims. However, the accompanying drawings, which are included to provide further understanding, illustrate disclosed aspects and together with the description serve to explain the principles of the subject technology. In the drawings:

FIG. 4 illustrates an example method for a passenger ingress process, according to some aspects of the disclosed technology.

DETAILED DESCRIPTION

Figure 1:
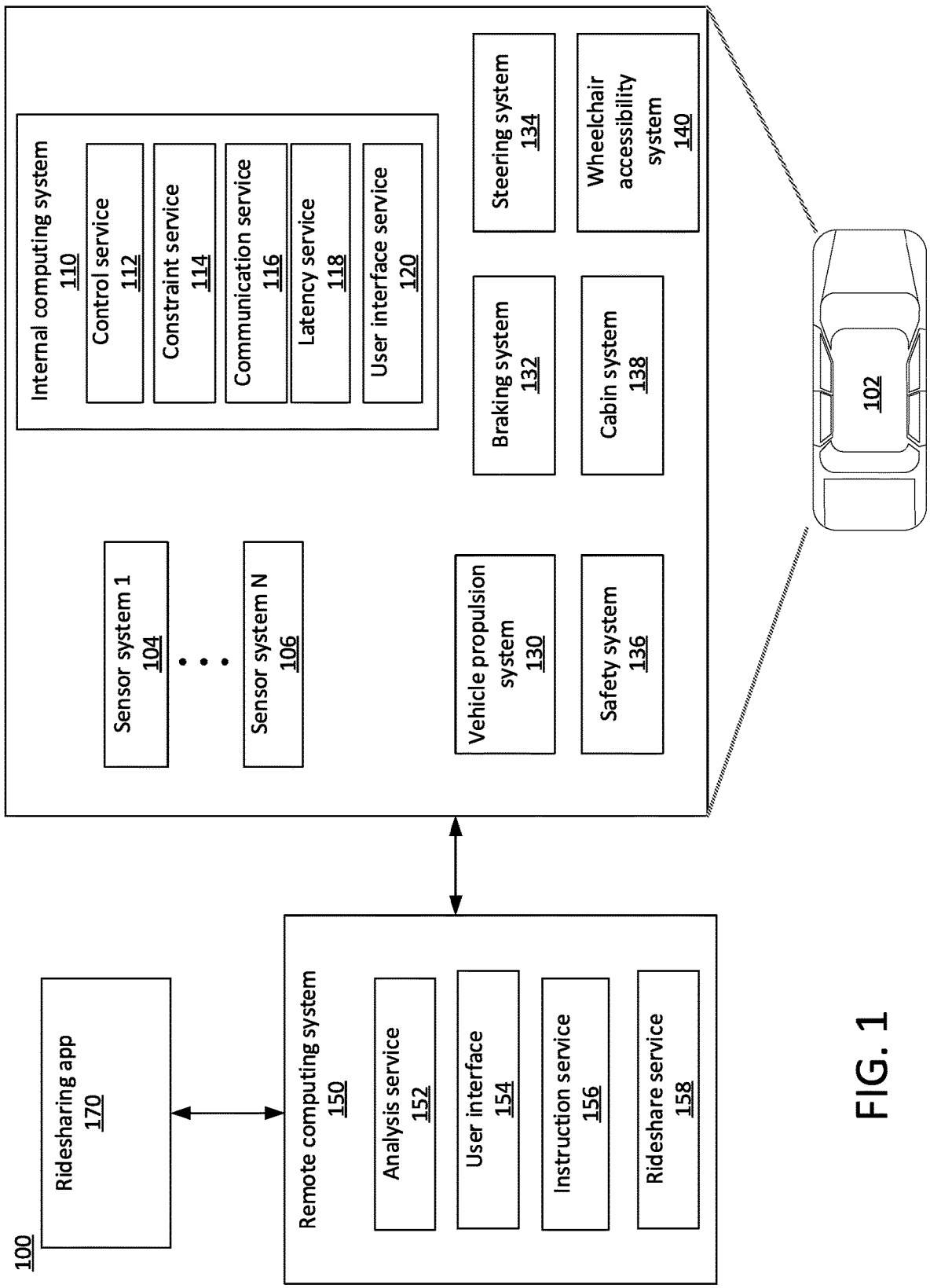
FIG. 1 illustrates an example environment that includes an autonomous vehicle in communication with a remote computing system, according to some aspects of the disclosed technology.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

For passengers who utilize wheelchairs, entering and exiting vehicles requires many different steps and procedures. Furthermore, in current vehicles, passengers who utilize wheelchairs regularly need another individual to assist the passenger with entering the vehicle. For example, an assistant or driver may assist the passenger by opening a door to the vehicle, unloading a ramp, securing the wheelchair in a cabin of the vehicle, loading the ramp, closing the vehicle door, etc.

These needs are doubled when the passenger eventually exits from the vehicle. In other words, an assistant or driver may need to assist the passenger by opening the door to the vehicle, unloading the ramp, releasing the wheelchair from any restraint systems in the cabin of the vehicle, loading the ramp, closing the door, etc.

These problems are further exacerbated with autonomous vehicles. Autonomous vehicles may not have a human driver to assist the passenger with entering and/or exiting the vehicle. Especially when autonomous vehicles are used in ridesharing environments, there will be scenarios, in which there is not an additional individual to assist with these tasks. Thus, there is a need for a wheelchair-accessible autonomous vehicle that passengers using wheelchairs can operate without another person to physically assist with ingress and/or egress.

Accordingly, aspects of the disclosed technology address the limitations of vehicles for wheelchair passengers. More specifically, a wheelchair passenger may utilize an application on a mobile device to send requests to and/or control wheelchair-accessible systems on an autonomous vehicle. In some aspects, a remote computing system may receive a request for a wheelchair-accessible autonomous vehicle (WAV) to execute an ingress function, such as deployment of a wheelchair ramp by the WAV. Furthermore, in response to the request, the remote computing system may send an ingress command to the WAV, such that the ingress command includes instructions to cause the WAV to execute the ingress function. Additionally, the remote computing system may receive feedback from the WAV indicating sensor data associated with the wheelchair ramp and status information associated with the ingress function.

FIG. 1 illustrates environment 100 that includes an autonomous vehicle 102 in communication with a remote computing system 150.

The autonomous vehicle 102 can navigate about roadways without a human driver based upon sensor signals output by sensor systems 104-106 of the autonomous vehicle 102. The autonomous vehicle 102 includes a plurality of sensor systems 104-106 (a first sensor system 104 through an Nth sensor system 106). The sensor systems 104-106 are of different types and are arranged about the autonomous vehicle 102. For example, the first sensor system 104 may be a camera sensor system, and the Nth sensor system 106 may be a lidar sensor system. Other exemplary sensor systems include radar sensor systems, global positioning system (GPS) sensor systems, inertial measurement units (IMU), infrared sensor systems, laser sensor systems, sonar sensor systems, and the like.

The autonomous vehicle 102 further includes several mechanical systems that are used to effectuate appropriate motion of the autonomous vehicle 102. For instance, the mechanical systems can include but are not limited to, a vehicle propulsion system 130, a braking system 132, and a steering system 134. The vehicle propulsion system 130 may include an electric motor, an internal combustion engine, or both. The braking system 132 can include an engine brake, brake pads, actuators, and/or any other suitable componentry that is configured to assist in decelerating the autonomous vehicle 102. The steering system 134 includes suitable componentry that is configured to control the direction of movement of the autonomous vehicle 102 during navigation.

The autonomous vehicle 102 further includes a safety system 136 that can include various lights and signal indicators, parking brake, airbags, etc. The autonomous vehicle 102 further includes a cabin system 138 that can include cabin temperature control systems, in-cabin entertainment systems, etc.

The autonomous vehicle 102 further includes a wheelchair accessibility system 140 that can include various electrical and mechanical systems including, but not limited to, doors, ramps, restraint systems, etc. Wheelchair accessibility system 140 is configured to assist passengers utilizing wheelchairs during ingress and egress of the autonomous vehicle 102.

The autonomous vehicle 102 additionally comprises an internal computing system 110 that is in communication with the sensor systems 104-106 and the systems 130, 132, 134, 136, 138, and 140. The internal computing system includes at least one processor and at least one memory having computer-executable instructions that are executed by the processor. The computer-executable instructions can make up one or more services responsible for controlling the autonomous vehicle 102, communicating with remote computing system 150, receiving inputs from passengers or human co-pilots, logging metrics regarding data collected by sensor systems 104-106 and human co-pilots, etc.

The internal computing system 110 can include a control service 112 that is configured to control the operation of the vehicle propulsion system 130, the braking system 132, the steering system 134, the safety system 136, and the cabin system 138. The control service 112 receives sensor signals from the sensor systems 104-106 as well communicates with other services of the internal computing system 110 to effectuate operation of the autonomous vehicle 102. In some embodiments, control service 112 may carry out operations in concert one or more other systems of autonomous vehicle 102.

The internal computing system 110 can also include a constraint service 114 to facilitate safe propulsion of the autonomous vehicle 102. The constraint service 114 includes instructions for activating a constraint based on a rule-based restriction upon operation of the autonomous vehicle 102. For example, the constraint may be a restriction upon navigation that is activated in accordance with protocols configured to avoid occupying the same space as other objects, abide by traffic laws, circumvent avoidance areas, etc. In some embodiments, the constraint service can be part of the control service 112.

The internal computing system 110 can also include a communication service 116. The communication service can include both software and hardware elements for transmitting and receiving signals from/to the remote computing system 150. The communication service 116 is configured to transmit information wirelessly over a network, for example, through an antenna array that provides personal cellular (long-term evolution (LTE), 3G, 5G, etc.) communication.

In some embodiments, one or more services of the internal computing system 110 are configured to send and receive communications to remote computing system 150 for such reasons as reporting data for training and evaluating machine learning algorithms, requesting assistance from remoting computing system or a human operator via remote computing system 150, software service updates, ridesharing pickup and drop off instructions etc.

The internal computing system 110 can also include a latency service 118. The latency service 118 can utilize timestamps on communications to and from the remote computing system 150 to determine if a communication has been received from the remote computing system 150 in time to be useful. For example, when a service of the internal computing system 110 requests feedback from remote computing system 150 on a time-sensitive process, the latency service 118 can determine if a response was timely received from remote computing system 150 as information can quickly become too stale to be actionable. When the latency service 118 determines that a response has not been received within a threshold, the latency service 118 can enable other systems of autonomous vehicle 102 or a passenger to make necessary decisions or to provide the needed feedback.

The internal computing system 110 can also include a user interface service 120 that can communicate with cabin system 138 in order to provide information or receive information to a human co-pilot or human passenger. In some embodiments, a human co-pilot or human passenger may be required to evaluate and override a constraint from constraint service 114, or the human co-pilot or human passenger may wish to provide an instruction to the autonomous vehicle 102 regarding destinations, requested routes, or other requested operations.

As described above, the remote computing system 150 is configured to send/receive a signal from the autonomous vehicle 102 regarding reporting data for training and evaluating machine learning algorithms, requesting assistance from remote computing system 150 or a human operator via the remote computing system 150, software service updates, rideshare pickup and drop off instructions, etc.

The remote computing system 150 includes an analysis service 152 that is configured to receive data from autonomous vehicle 102 and analyze the data to train or evaluate machine learning algorithms for operating the autonomous vehicle 102. The analysis service 152 can also perform analysis pertaining to data associated with one or more errors or constraints reported by autonomous vehicle 102.

The remote computing system 150 can also include a user interface service 154 configured to present metrics, video, pictures, sounds reported from the autonomous vehicle 102 to an operator of remote computing system 150. User interface service 154 can further receive input instructions from an operator that can be sent to the autonomous vehicle 102.

The remote computing system 150 can also include an instruction service 156 for sending instructions regarding the operation of the autonomous vehicle 102. For example, in response to an output of the analysis service 152 or user interface service 154, instructions service 156 can prepare instructions to one or more services of the autonomous vehicle 102 or a co-pilot or passenger of the autonomous vehicle 102.

The remote computing system 150 can also include a rideshare service 158 configured to interact with ridesharing application 170 operating on (potential) passenger computing devices. The rideshare service 158 can receive requests to be picked up or dropped off from passenger ridesharing app 170 and can dispatch autonomous vehicle 102 for the trip. The rideshare service 158 can also act as an intermediary between the ridesharing app 170 and the autonomous vehicle wherein a passenger might provide instructions to the autonomous vehicle 102 to go around an obstacle, change routes, honk the horn, etc. The ridesharing application 170 can also be configured to receive requests specifically for wheelchair-accessible autonomous vehicles 102. Similarly, ridesharing app 170 can also be configured to receive requests from a passenger for the autonomous vehicle 102 to perform a function and send the request to the rideshare service 158 of the remote computing system 150. The remote computing system 150 can then process the request and send commands to the communication service 116 of the internal computing system of the autonomous vehicle 102, so that the autonomous vehicle 102 can execute the request.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

Figure 2:
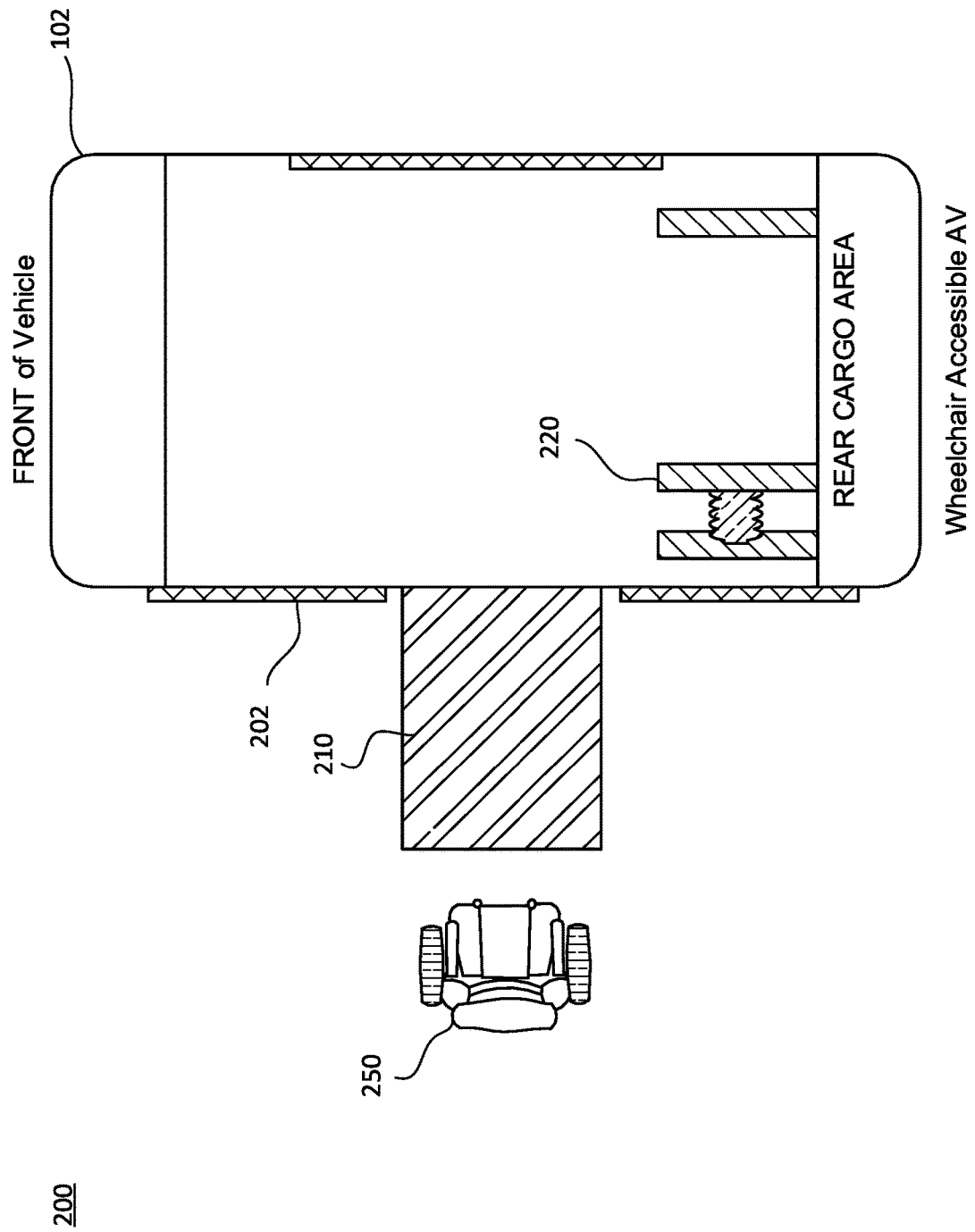
FIG. 2 illustrates an example environment that includes a passenger entering a wheelchair-accessible autonomous vehicle, according to some aspects of the disclosed technology.

FIG. 2 shows an example environment 200, in which an autonomous vehicle 102 has accessories to be wheelchair accessible. Accordingly, autonomous vehicle 102 is a wheelchair-accessible autonomous vehicle (WAV) 102. More specifically, WAV 102 has automatic doors 202, a wheelchair ramp 210, and a wheelchair restraint system 220. Thus, WAV 102 is configured to accommodate a wheelchair 250 of a passenger and/or a wheelchair passenger 250.

The automatic doors 202 are configured to receive commands from an internal computing system, such as the internal computing system 110, and/or a remote computing system, such as remote computing system 150. The doors 202 can, in response to receive commands from the internal computing system and/or remote computing system, automatically open and/or close to allow passengers and objects to pass therethrough. For example, wheelchair passenger 250 may send, via an application on a mobile device, a request for the WAV to open doors to a remote computing system. In response to receiving the request, the remote computing system may then send a command to the internal computing system. In response to receiving the command, the internal computing system can then control the doors 202 to open and/or send a command to a system controlling the doors 202 to open the doors 202.

Like doors 202, wheelchair ramp 210 is configured to receive commands from the internal computing system 110 and/or the remote computing system 150. The wheelchair ramp 210 can, in response to receiving commands from the internal computing system and/or remote computing system, automatically load and/or unload to allow wheelchairs to be cross thereon.

Similarly, wheelchair restraint system 220 is configured to receive commands from the internal computing system 110 and/or the remote computing system 150. The wheelchair restraint system 220 can, in response to receiving commands from the internal computing system and/or remote computing system, automatically secure and/or release a wheelchair.

Figure 3A:
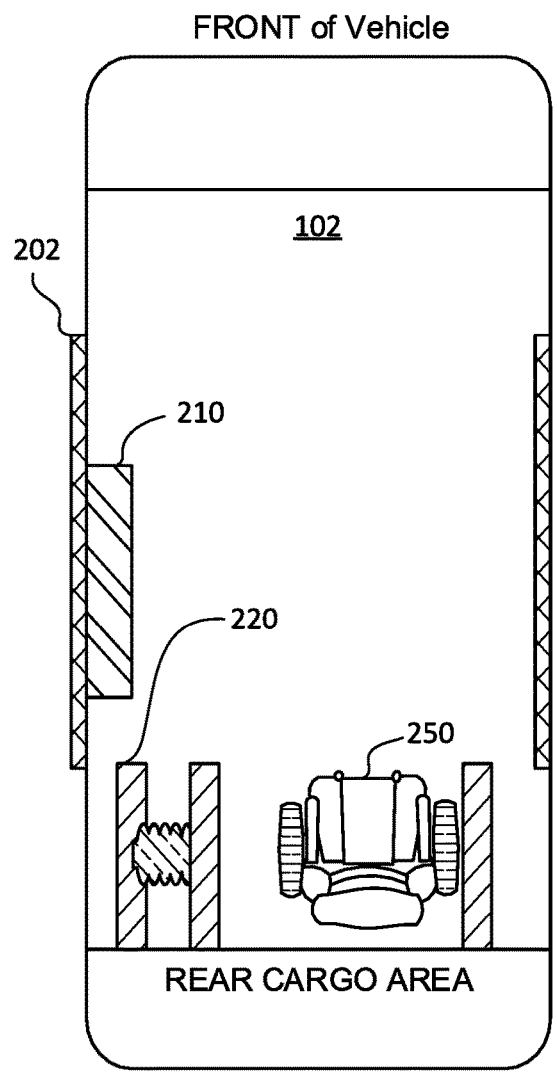
FIG. 3A-3B illustrate example environments during various example steps of a passenger entering a wheelchair-accessible autonomous vehicle, according to some aspects of the disclosed technology.
Figure 3B:
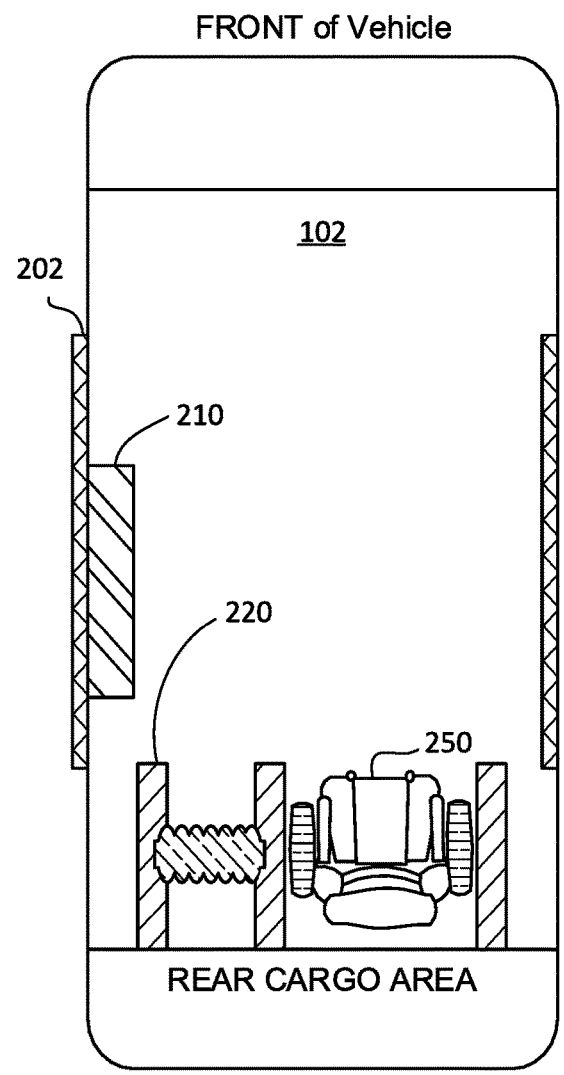

FIG. 3A-3B show example environments 300a, 300b during various steps of restraining and/or securing the wheelchair 250.

More specifically, FIG. 3A illustrates the wheelchair and/or wheelchair passenger 250 in a cabin of the WAV 102. After the wheelchair passenger 250 has entered the cabin of the WAV 102, the ramp 210 may be loaded back onto WAV 102 and the doors 202 closed. Although not shown, in some embodiments, the doors 102 may not be closed yet and/or the ramp may not be loaded yet. Although the wheelchair passenger 250 has enter the cabin of the WAV, the wheelchair restraint system 220 has not yet been engaged. The wheelchair passenger 250 may position the wheelchair in the cabin, such that the wheelchair restraint system 220 may, after being engaged, secure the wheelchair.

FIG. 3B illustrates the wheelchair and/or wheelchair passenger 250 secured by the wheelchair restraint system 220. Furthermore, wheelchair ramp 210 may be loaded back onto WAV 102 and the doors 202 closed. At this time, wheelchair passenger 250 may send information to WAV 102 indicating that the wheelchair passenger 250 is ready for WAV 102 to begin driving. In other words, after the wheelchair and/or wheelchair passenger 250 is properly secured by wheelchair restraint system 220, the doors 202 closed, and the wheelchair ramp 210 loaded, WAV 102 can begin driving.

FIG. 4 shows an example method 400 for assisting passenger ingress. Example method 400 starts at step 402, in which a remote computing system receives a rideshare request to use a wheelchair-accessible autonomous vehicle (WAV). In some embodiments, the remote computing system receives and processes the rideshare request through a rideshare service, such as rideshare service 158.

At step 404, the remote computing system dispatches the WAV to a location of the passenger. In some embodiments, the remote computing system dispatches the WAV through a rideshare service, such as rideshare service 158. The WAV may receive the dispatch information through communication service 116. In some embodiments, the location of the passenger may be determined using location services, such as Global Positioning System (GPS), cellular networks, etc. Similarly, in some embodiments, the passenger may set the location. Accordingly, the location of the passenger may, in some scenarios, be different from an actual position of the passenger when the passenger submits the request.

At step 406, the remote computing system determines that the WAV has arrived at the location of the passenger. The remote computing system may utilize similar location services, cellular networks, etc. to determine a location of both the WAV and the location of the passenger.

At step 408, the remote computing system receives a request for the WAV to execute an ingress function. The request may be sent through a ridesharing application, such as ridesharing app 170. The request may then be received through a rideshare service, such as rideshare service 158. The remote computing system may then process the request and determine the ingress function. In some embodiments, the ingress function may include a deployment of a wheelchair ramp by the WAV and/or loading the wheelchair ramp after the passenger has boarded the WAV. Similarly, in some embodiments, the ingress function may include opening doors of the WAV and/or closing the doors of the WAV after the passenger has boarded the WAV. Likewise, in some embodiments, the ingress function may include engaging an automated restraint system configured to secure the wheelchair in the WAV. In some embodiments, the ingress function may be any combination of the above processes.

At step 410, the remote computing system sends an ingress command to the WAV in response to the request. In some embodiments, the remote computing system sends the command to the internal computing system of the WAV, which receives the command through a communication service, such as communication service 116. The ingress command comprises instructions to cause the WAV to execute the ingress function at a specified pick-up location, such as the location of the passenger.

At step 412, the remote computing system receives feedback from the WAV. As the WAV executes the ingress function, the WAV may send feedback to the remote computing system. In some embodiments, the WAV may send the feedback through a communication service, such as communication service 116. The feedback may include sensor data associated with a door to the WAV, a wheelchair ramp, and/or a wheelchair restraint system. For example, the sensor data may indicate that the wheelchair ramp is being unloaded. Similarly, the feedback may include status information associated with the ingress function. For example, the status information may indicate that a request has been received, that the WAV is executing the ingress function, that the WAV has completed the ingress function, that there is a fault state, etc.

At step 414, the remote computing system sends at least a portion of the feedback to the passenger of the WAV. In some embodiments, the remote computing system may send the feedback to the passenger through a rideshare service, such as rideshare service 158. Accordingly, the passenger will be aware of the status of the WAV executing the ingress function. In some embodiments, the remote computing system may send the status information associated with the ingress function to the passenger. In some embodiments, the remote computing system may send all of the feedback to the passenger.

In some embodiments, at step 416, the remote computing system determines that the status of the function includes a fault state. A fault state may be any state, in which the WAV is unable to complete the ingress function. For example, the WAV may include in the feedback, that a fault state has been detected because the sensors have detected an object passing by, such that the wheelchair ramp cannot be unloaded safely. As another example, the WAV may include in the feedback, that a fault state has been detected because the wheelchair should be moved a few inches to be properly restrained. Thus, the remote computing system can connect the passenger with a remote assistance operator. In some embodiments, the passenger may first resend the request. For example, the passenger may resent the request after moving the wheelchair in a suggested direction to be properly restrained. In some embodiments, the remote computing system may automatically connect the passenger with the remote assistance operator. The remote assistance operator may assist the passenger remotely. For example, the remote assistance operator may receive additional sensor data to determine the cause of the fault state. The remote assistance operator may then remotely send commands to the WAV to complete the ingress function.

At step 418, the remote computing system receives information from the passenger indicating readiness for the WAV to begin driving. In some embodiments, after the passenger has boarded the WAV and the wheelchair is properly secured and/or restrained, the passenger may send information to the remote computing system and/or the internal computing system of the WAV. In some embodiments, the passenger may send the information through a rideshare app, such as rideshare app 170, on the mobile device of the passenger. In some embodiments, the WAV may have sensors in the cabin of the vehicle to determine that the passenger is ready. For example, the WAV may have microphones, such that the WAV may determine that the passenger is ready if the passenger says, "I am ready." In some embodiments, the ingress functions may include loading the ramp and closing the doors. In other embodiments, the internal computing system may, in response to determining that the passenger is ready, load the ramp, close the doors, and/or secure the wheelchair.

Figure 5:
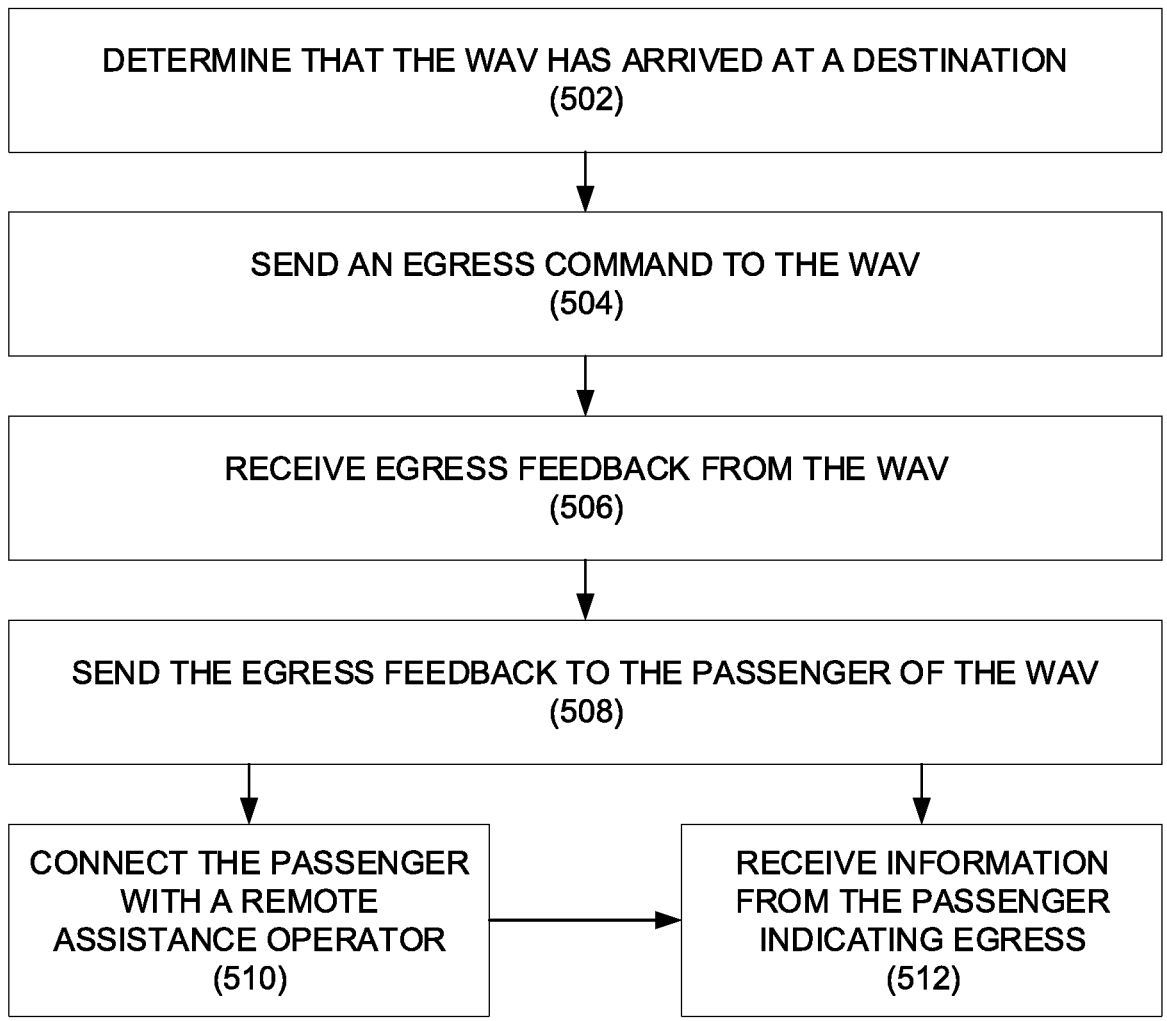
FIG. 5 illustrates an example method for a passenger egress process, according to some aspects of the disclosed technology.

FIG. 5 shows an example method 500 for assisting passenger egress. Example method 500 may be used in conjunction with example method 400 and/or alone. Example method 500 starts at step 502, in which the remote computing system determines that the WAV has arrived at a destination. The remote computing system may utilize similar location services, cellular networks, etc. to determine a location of both the WAV and the location of the destination.

At step 504, the remote computing system sends an egress command to the WAV. The egress command includes egress instructions to cause the WAV to execute an egress function. In some embodiments, the remote computing system may send the egress command in response to receiving a request for the WAV to execute the egress function. The request may be sent through a ridesharing application, such as ridesharing app 170. The request may then be received through a rideshare service, such as rideshare service 158. The remote computing system may then process the request and determine the egress function. In some embodiments, the egress function may include a deployment of a wheelchair ramp by the WAV and/or loading the wheelchair ramp after the passenger has exited the WAV. Similarly, in some embodiments, the egress function may include opening doors of the WAV and/or closing the doors of the WAV after the passenger has exited the WAV. Likewise, in some embodiments, the egress function may include disengaging an automated restraint system configured to release the wheelchair in the WAV. In some embodiments, the egress function may be any combination of the above processes. In some embodiments, the remote computing system sends the command to the internal computing system of the WAV, which receives the egress command through a communication service, such as communication service 116. The egress command comprises instructions to cause the WAV to execute the egress function at a specified drop-off location, such as the destination.

At step 506, the remote computing system receives egress feedback from the WAV. As the WAV executes the egress function, the WAV may send egress feedback to the remote computing system. In some embodiments, the WAV may send the egress feedback through a communication service, such as communication service 116. The egress feedback may include egress sensor data associated with a door to the WAV, a wheelchair ramp, and/or a wheelchair restraint system. For example, the egress sensor data may indicate that the wheelchair ramp is being unloaded. Similarly, the egress feedback may include status information associated with the egress function. For example, the status information may indicate that a request has been received, that the WAV is executing the egress function, that the WAV has completed the egress function, that there is a fault state, etc.

At step 508, the remote computing system sends at least a portion of the egress feedback to the passenger of the WAV. In some embodiments, the remote computing system may send the egress feedback to the passenger through a rideshare service, such as rideshare service 158. Accordingly, the passenger will be aware of the status of the WAV executing the egress function. In some embodiments, the remote computing system may send the status information associated with the egress function to the passenger. In some embodiments, the remote computing system may send all of the feedback to the passenger.

In some embodiments, at step 510, the remote computing system determines that the status of the egress function includes a fault state. A fault state may be any state, in which the WAV is unable to complete the egress function. For example, the WAV may include in the egress feedback, that a fault state has been detected because the sensors have detected an object passing by, such that the wheelchair ramp cannot be unloaded safely. Thus, the remote computing system connects the passenger with a remote assistance operator. In some embodiments, the passenger may first resend the request. In some embodiments, the remote computing system may automatically connect the passenger with the remote assistance operator. The remote assistance operator may assist the passenger remotely. For example, the remote assistance operator may receive additional sensor data to determine the cause of the fault state. The remote assistance operator may then remotely send commands to the WAV to complete the egress function.

At step 512, the remote computing system receives information from the passenger indicating egress. In other words, the remote computing system receives information from the passenger that the passenger has fully disembarked from the WAV. In some embodiments, after the passenger has exited the WAV, the passenger may send information to the remote computing system and/or the internal computing system of the WAV. In some embodiments, the passenger may send the information through a rideshare app, such as rideshare app 170, on the mobile device of the passenger. In some embodiments, the WAV may have sensors on an exterior of the cabin of the vehicle to determine that the passenger has disembarked from the WAV. For example, the WAV may have cameras on an exterior of the WAV, such that the WAV may determine that the passenger has deboarded when the cameras detect the wheelchair has moved away from the wheelchair ramp. The WAV may then load the wheelchair ramp, close the doors, and begin a new rideshare journey.

Figure 6:
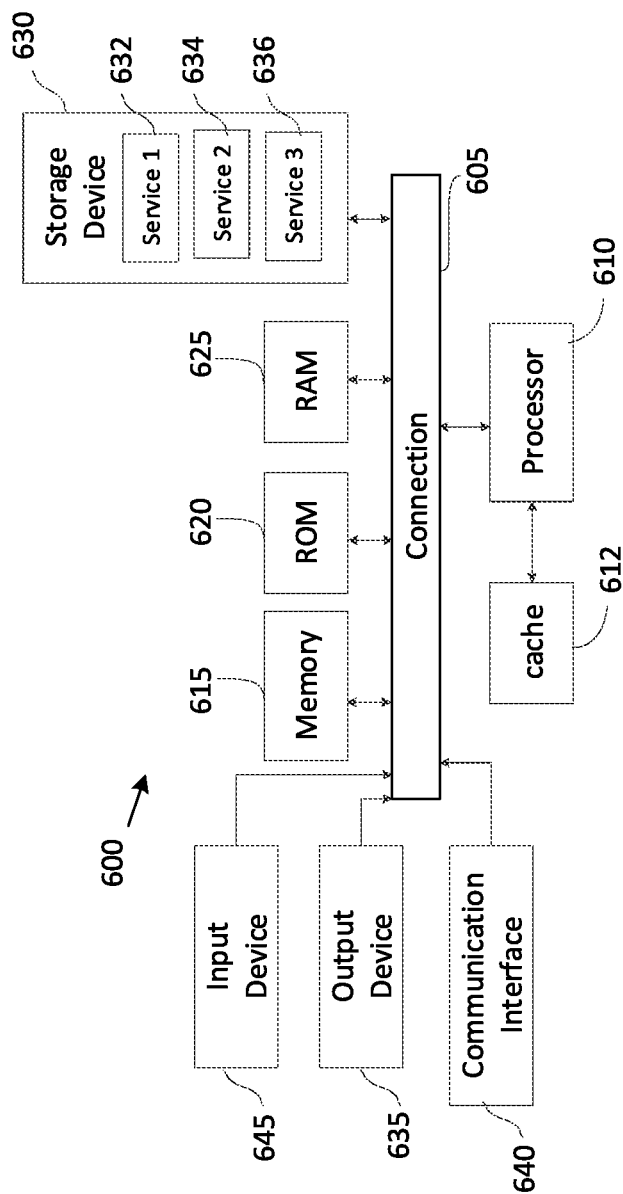
FIG. 6 illustrates an example processor-based system with which some aspects of the subject technology can be implemented.

FIG. 6 shows an example of computing system 600, which can be for example any computing device making up internal computing system 110, remote computing system 150, (potential) passenger device executing rideshare app 170, or any component thereof in which the components of the system are in communication with each other using connection 605. Connection 605 can be a physical connection via a bus, or a direct connection into processor 610, such as in a chipset architecture. Connection 605 can also be a virtual connection, networked connection, or logical connection.

In some embodiments, computing system 600 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 600 includes at least one processing unit (CPU or processor) 610 and connection 605 that couples various system components including system memory 615, such as read-only memory (ROM) 620 and random access memory (RAM) 625 to processor 610. Computing system 600 can include a cache of high-speed memory 612 connected directly with, in close proximity to, or integrated as part of processor 610.

Processor 610 can include any general purpose processor and a hardware service or software service, such as services 632, 634, and 636 stored in storage device 630, configured to control processor 610 as well as a special-purpose processor where software instructions are incorporated into the actual processor design. Processor 610 may essentially be a completely self-contained computing system, containing multiple cores or processors, a bus, memory controller, cache, etc. A multi-core processor may be symmetric or asymmetric.

To enable user interaction, computing system 600 includes an input device 645, which can represent any number of input mechanisms, such as a microphone for speech, a touch-sensitive screen for gesture or graphical input, keyboard, mouse, motion input, speech, etc. Computing system 600 can also include output device 635, which can be one or more of a number of output mechanisms known to those of skill in the art. In some instances, multimodal systems can enable a user to provide multiple types of input/output to communicate with computing system 600. Computing system 600 can include communications interface 640, which can generally govern and manage the user input and system output. There is no restriction on operating on any particular hardware arrangement, and therefore the basic features here may easily be substituted for improved hardware or firmware arrangements as they are developed.

Storage device 630 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 630 can include software services, servers, services, etc., that when the code that defines such software is executed by the processor 610, it causes the system to perform a function. In some embodiments, a hardware service that performs a particular function can include the software component stored in a computer-readable medium in connection with the necessary hardware components, such as processor 610, connection 605, output device 635, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A method comprising:
   receiving a request for a wheelchair-accessible autonomous vehicle (WAV) to execute an ingress function, wherein the ingress function includes a deployment of a wheelchair ramp by the WAV and engaging an automated restraint system configured to secure a wheelchair in the WAV;
   sending an ingress command to the WAV in response to the request, wherein the ingress command comprises instructions to cause the WAV to execute the ingress function at a specified pick-up location; and
   receiving feedback from the WAV, wherein the feedback includes sensor data associated with the wheelchair ramp and the automated restraint system and status information associated with the ingress function.

2. The method of claim 1, wherein the ingress function further includes opening doors of the WAV.

3. The method of claim 1, further comprising:
   determining that the WAV has arrived at a destination;
   sending an egress command to the WAV, wherein the egress command comprises egress instructions to cause the WAV to execute an egress function at the destination, wherein the egress function includes a deployment of the wheelchair ramp by the WAV; and
   receiving egress feedback from the WAV, the egress feedback includes egress sensor data associated with the wheelchair ramp and egress status information associated with the egress function.

4. The method of claim 1, further comprising:
   sending the feedback to a passenger of the WAV, wherein the passenger utilizes the wheelchair.

5. The method of claim 1, further comprising:
   receiving a rideshare request to use the WAV for ridesharing;
   dispatching the WAV to a location of a passenger; and
   determining that the WAV has arrived at the location of the passenger.

6. The method of claim 1, further comprising:
   connecting a passenger with a remote assistance operator if the status information indicates a fault state.

7. The method of claim 1, further comprising:
   receiving information from a passenger, the information indicating readiness for the WAV to begin driving.

8. A non-transitory computer-readable medium comprising instructions stored therein, which when executed by one or more processors cause the one processors to perform operations, comprising:
   receiving a request for a wheelchair-accessible autonomous vehicle (WAV) to execute an ingress function, wherein the ingress function includes a deployment of a wheelchair ramp by the WAV and engaging an automated restraint system configured to secure a wheelchair in the WAV;
   sending an ingress command to the WAV in response to the request, wherein the ingress command comprises instructions to cause the WAV to execute the ingress function at a specified pick-up location; and
   receiving feedback from the WAV, wherein the feedback includes sensor data associated with the wheelchair ramp and the automated restraint system and status information associated with the ingress function.

9. The non-transitory computer-readable medium of claim 8, further comprising:
   determining that the WAV has arrived at a destination;
   sending an egress command to the WAV, wherein the egress command comprises egress instructions to cause the WAV to execute an egress function at the destination, wherein the egress function includes a deployment of the wheelchair ramp by the WAV; and
   receiving egress feedback from the WAV, the egress feedback includes egress sensor data associated with the wheelchair ramp and egress status information associated with the egress function.

10. The non-transitory computer-readable medium of claim 8, further comprising:
    sending the feedback to a passenger of the WAV, wherein the passenger utilizes a wheelchair.

11. The non-transitory computer-readable medium of claim 8, further comprising:

receiving a rideshare request to use the WAV for ridesharing;

dispatching the WAV to a location of a passenger; and determining that the WAV has arrived at the location of the passenger.

12. The non-transitory computer-readable medium of claim 8, further comprising:

connecting a passenger with a remote assistance operator if the status information indicates a fault state.

13. The non-transitory computer-readable medium of claim 8, further comprising:

receiving information from a passenger, the information indicating readiness for the WAV to begin driving.

14. A system comprising:

one or more processors; and a computer-readable medium comprising instructions stored therein, which when executed by the one or more processors, cause the one or more processors to perform operations comprising:

receiving a request for a wheelchair-accessible autonomous vehicle (WAV) to execute an ingress function, wherein the ingress function includes a deployment of a wheelchair ramp by the WAV and engaging an automated restraint system configured to secure a wheelchair in the WAV;

sending an ingress command to the WAV in response to the request, wherein the ingress command comprises instructions to cause the WAV to execute the ingress function at a specified pick-up location; and receiving feedback from the WAV, wherein the feedback includes sensor data associated with the wheelchair ramp and the automated restraint system and status information associated with the ingress function.

15. The system of claim 14, wherein the instructions further cause the one or more processors to perform operations comprising:

determining that the WAV has arrived at a destination;

sending an egress command to the WAV, wherein the egress command comprises egress instructions to cause the WAV to execute an egress function at the destination, wherein the egress function includes a deployment of the wheelchair ramp by the WAV; and receiving egress feedback from the WAV, the egress feedback includes egress sensor data associated with the wheelchair ramp and egress status information associated with the egress function.

16. The system of claim 14, wherein the instructions further cause the one or more processors to perform operations comprising:

sending the feedback to a passenger of the WAV, wherein the passenger utilizes a wheelchair.

17. The system of claim 14, wherein the instructions further cause the one or more processors to perform operations comprising:

receiving a rideshare request to use the WAV for ridesharing;

dispatching the WAV to a location of a passenger; and determining that the WAV has arrived at the location of the passenger.

18. The system of claim 14, wherein the instructions further cause the one or more processors to perform operations comprising:

connecting a passenger with a remote assistance operator if the status information indicates a fault state.

19. The method of claim 1, wherein the status information indicates that a fault state has been detected, the method further comprising:

providing a reason for the fault state to a passenger of the WAV.

20. The method of claim 19, further comprising receiving a request that is re-sent by the passenger after the passenger is provided the reason for the fault state; and completing the ingress function.

* * * * *